Nov. 14, 1933.  J. DERRY  1,935,239
MACHINE FOR WRAPPING TIRE BEADS
Filed Feb. 17, 1932   6 Sheets-Sheet 4

Inventor:
Jasper Derry,
by Walter E. Lombard.
Atty.

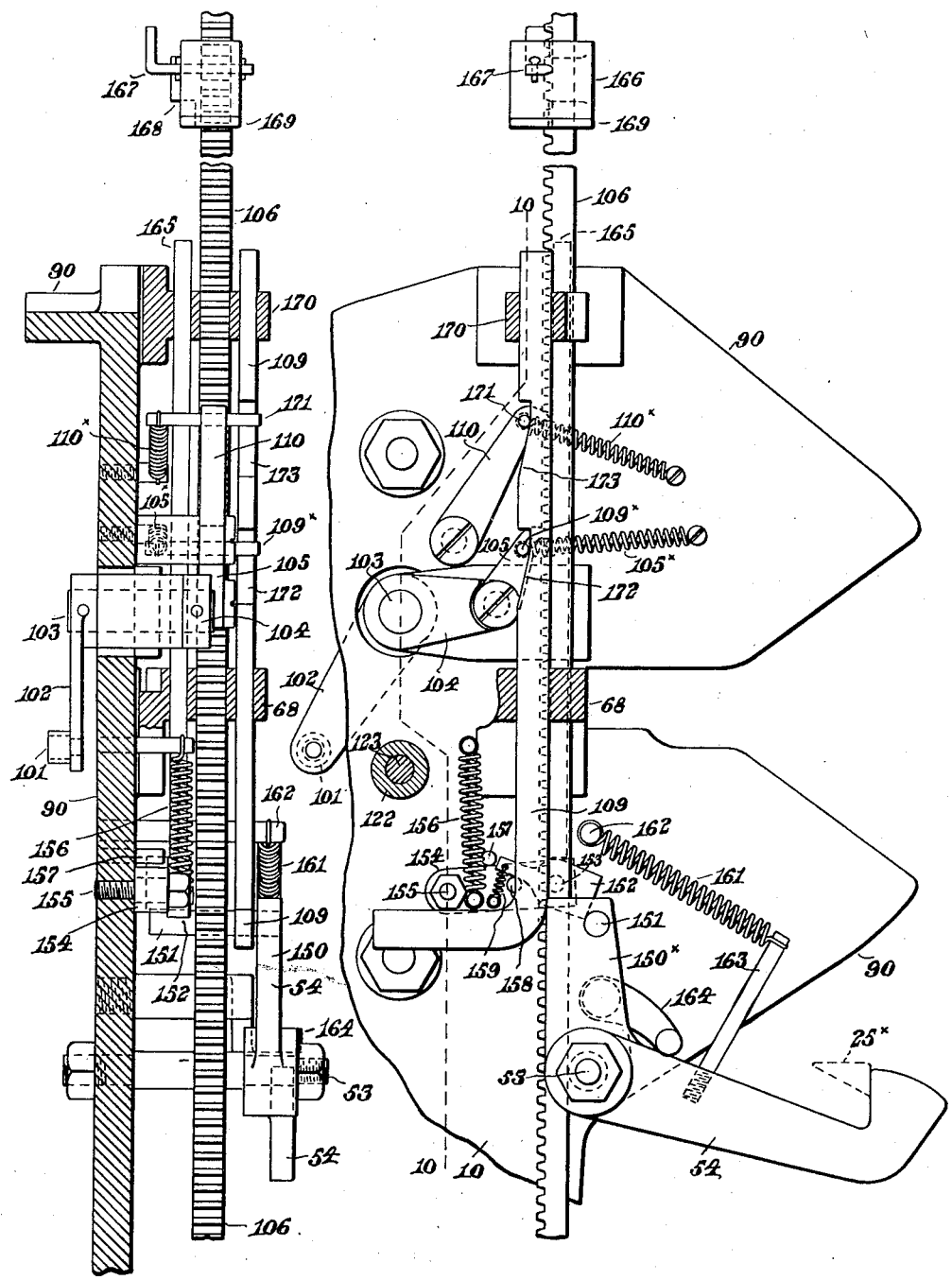

Nov. 14, 1933. J. DERRY 1,935,239
MACHINE FOR WRAPPING TIRE BEADS
Filed Feb. 17, 1932 6 Sheets-Sheet 6
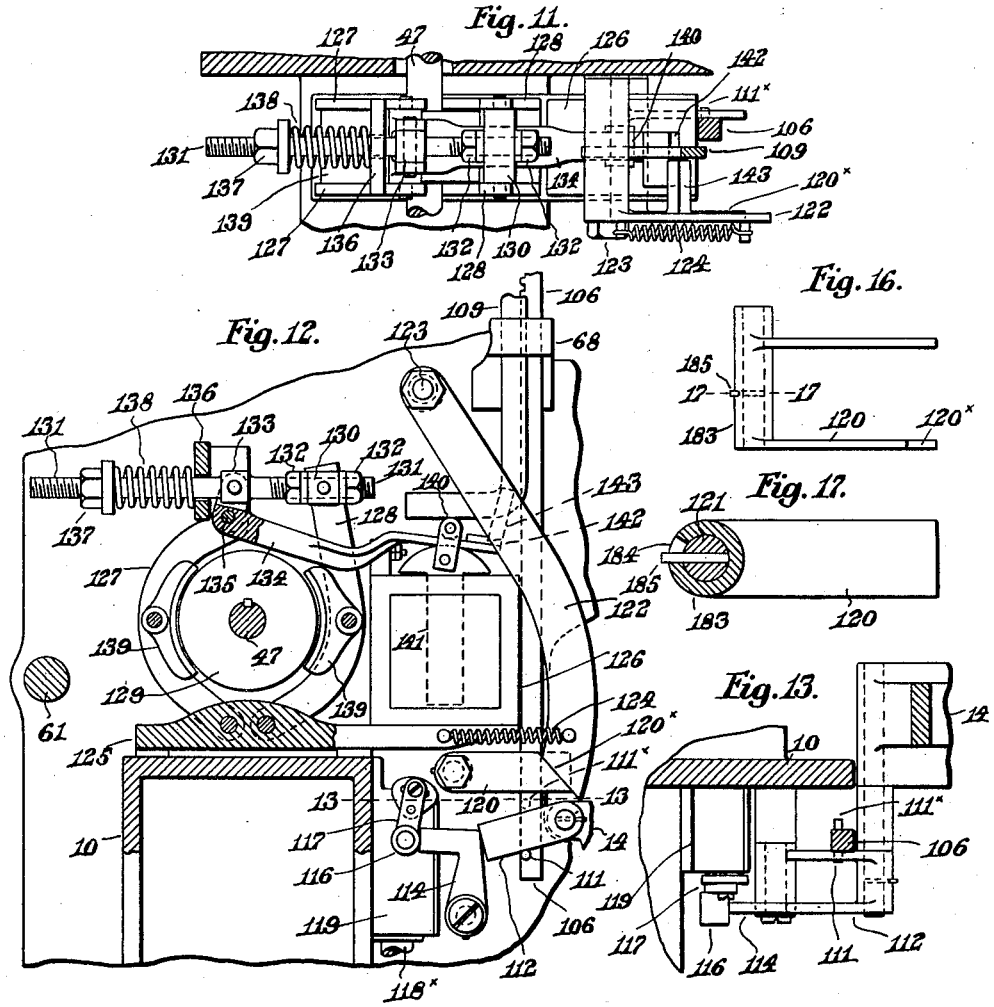
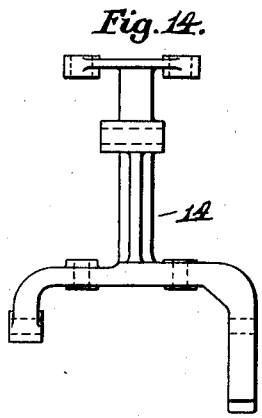
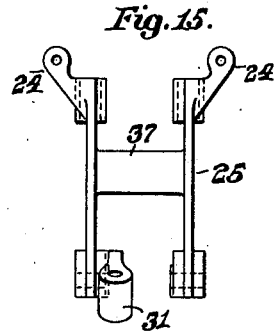
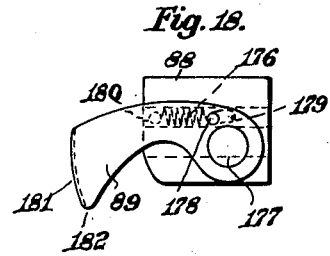
Inventor:
Jasper Derry,
by Walter E. Lombard.
Atty.

Patented Nov. 14, 1933

1,935,239

UNITED STATES PATENT OFFICE 1,935,239

MACHINE FOR WRAPPING TIRE BEADS

Jasper Derry, Medford, Mass., assignor to Andrew Terkelsen, Newton Center, Mass.

Application February 17, 1932. Serial No. 593,614

44 Claims. (Cl. 117—41)

This invention relates to wrapping machines and particularly to machines designed to wrap the beads used in the manufacture of tires for motor vehicles, the object of the invention being the production of a semi-automatic machine which will wrap either the whole or part of a bead, cut off the material used in wrapping and then stop to permit the removal of a wrapped bead and the insertion of another bead to be wrapped.

This object is obtained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings

Figure 9 represents an enlarged sectional detail of the mechanisms for controlling the amount of tape to be wrapped.

Figure 10 represents a section thereof on line 10, 10 on Fig. 9.

Figure 11 represents a plan of the brake actuating mechanism.

Figure 12 represents a sectional elevation of the same.

Figure 13 represents a section on line 13, 13 on Fig. 12.

Figure 14 represents an elevation of the bead-supporting rocker frame.

Figure 15 represents an elevation of the gear-supporting rocker frame.

Figure 16 represents a plan of a pivoted arm actuated by the tape-measuring member.

Figure 17 represents a section of same on line 17, 17 on Fig. 16, and

Figure 18 represents a plan of the tape-gripping finger.

Similar characters indicate like parts throughout the several figures of the drawings.

Figure 1:
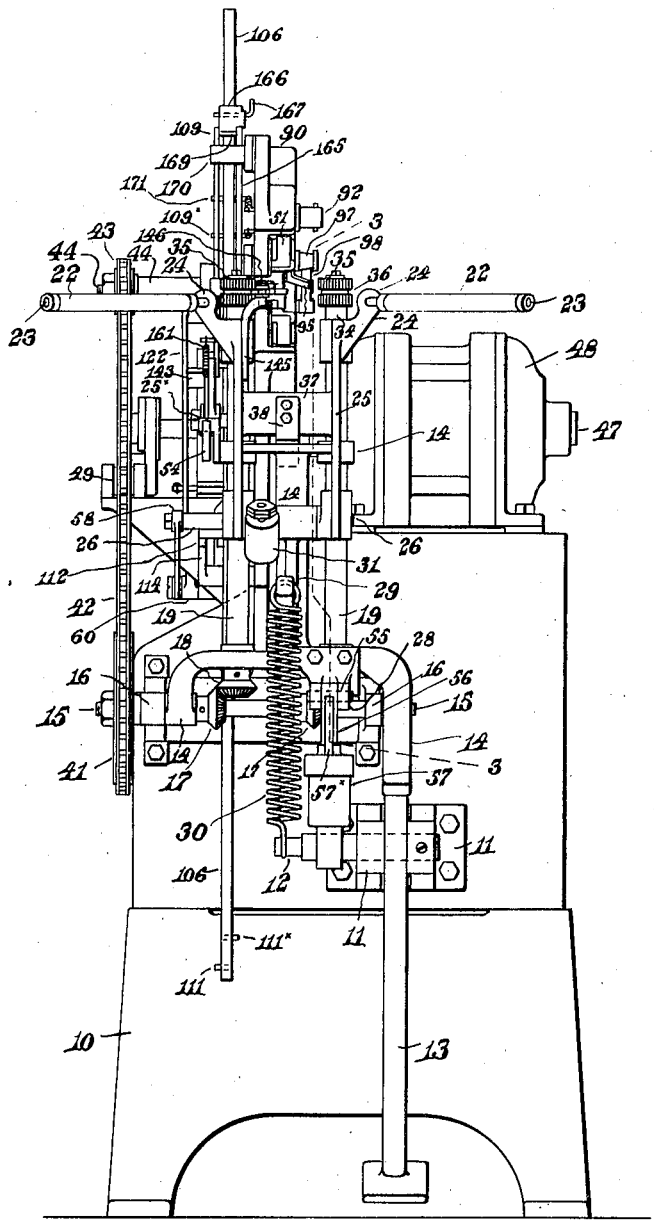
Figure 1 represents a front elevation of a machine embodying the principles of the present invention.

In the drawings, 10 is a frame having a pair of forwardly extending ears 11 supporting a fixed pivot pin 12 on which a treadle 13 is loosely mounted.

The treadle 13 is provided with an upward extension which bears against the downward extension of a member 14 pivotally mounted on a shaft 15 revoluble in bearings in brackets 16 secured to the front of the frame 10.

This member 14 is adapted to rock forwardly from the position indicated in the drawings and be returned to its operative position by the depression of the treadle 13.

The shaft 15 has secured thereto two bevel gears 17 meshing with bevel gears 18 on two parallel vertical shafts 19 revolubly mounted in bearings formed on the member 14 and having secured to the upper ends thereof the spur gears 20, each having an annular groove 21 therein to received a bead B to be wrapped, the outer portion of said bead B resting on rollers 22 revolubly mounted on supporting rods 23 extending forwardly from ears 24 forming a part of a forked arm or frame 25 pivoted at 26 to the member 14.

The arm or frame 25 may move forwardly about the pivot 26 and relatively to the member 14 to facilitate the removal of a wrapped bead and the positioning of another bead to be wrapped.

Figure 2:
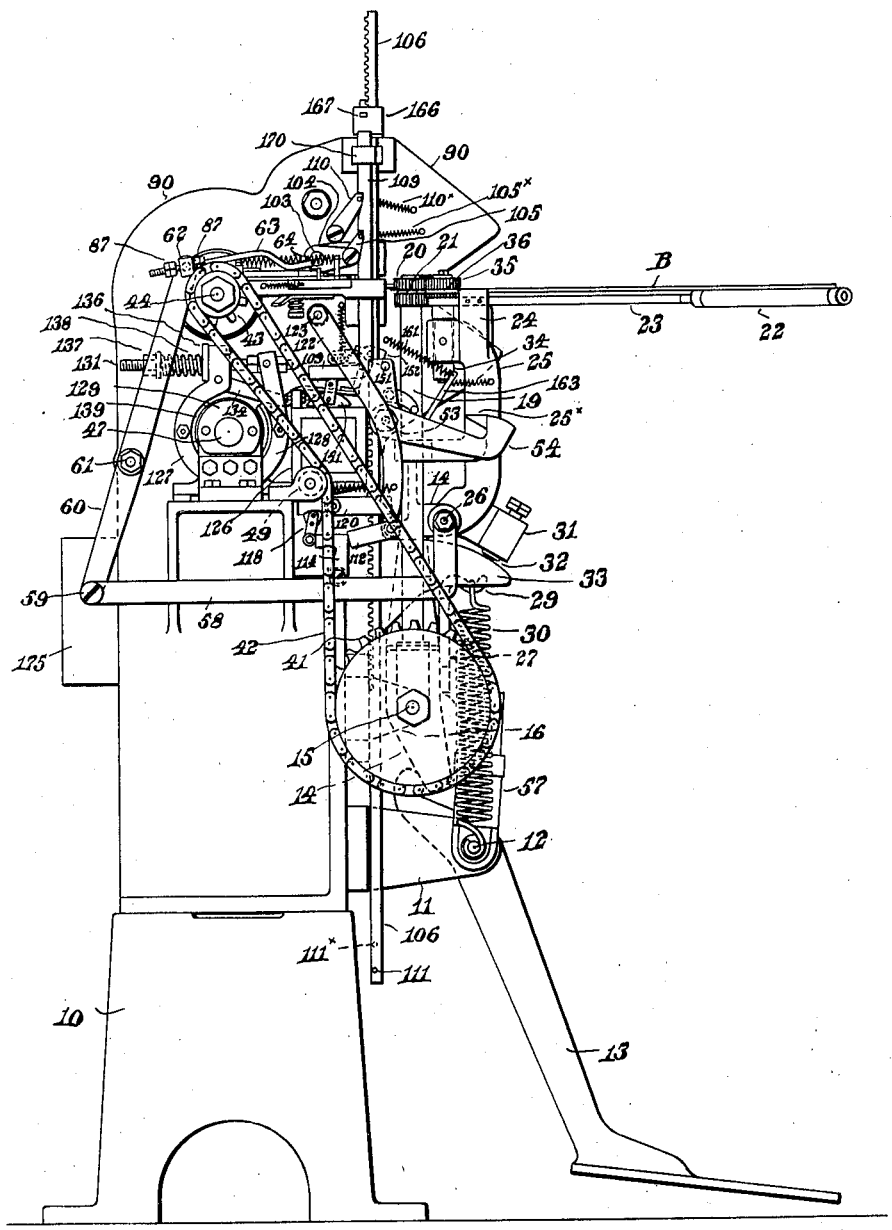
Figure 2 represents a side elevation thereof.

As shown in Fig. 2, the treadle 13 is in its lowest position and the bead B is in position to be wrapped.

The member 14 has secured thereto a plate 27 provided at its lowest end with an ear 28 and at its upper end with a hook 29.

Between the hook 29 and the pivot pin 12 is a helical spring 30 which will act when the foot is removed from treadle 13 to tilt the member 14 forwardly about the shaft 15 so that the operator may remove a wrapped bead B and place in position another bead B to be wrapped.

The forked arm or frame 25 has a forward projection 31 containing a spring-pressed roller 32 adapted to coact with a cam member 33 projecting forwardly from the front of the frame 10 while a bead is being wrapped.

When the operator, by depression of treadle 13 moves the member 14 rearwardly about the shaft 15, the roller 32 will come into contact with cam 33 and as it moves over the cam surface the arm or frame 25 will be moved about its pivot 26 toward the member 14.

The forked arm 25 has bearings in which are mounted parallel members 34 on the upper ends of which are revolubly mounted spur gears 35, each having an annular groove 36 therein opposite the groove 21 of a gear 20.

During the wrapping of a bead, said bead is between the two gears 20 and the two gears 35, the gears 35 being driven by the gears 20 with which at this time they are in mesh.

Extending rearwardly from the transom 37 of forked arm 25 is a member 38 having a downward extension 39 adapted to contact with the part 40 of the member 14 and limit the forward movement of the arm 25 about the pivot 26.

It will be noted that the member 14 may be moved forwardly a limited distance about the shaft 15 and that the arm 25 may be moved forwardly a greater distance about the pivot 26.

The shaft 15 has secured to one end thereof a sprocket wheel 41 connected by chain 42 to a smaller sprocket wheel 43 on a shaft 44 extending through the upper part of frame 10.

To the opposite end of shaft 44 is secured a gear 45 in mesh with a gear 46 on the shaft 47 of an electric motor 48.

Coacting with the belt 42 is an idler pulley 49 adapted to keep the belt 42 taut under all conditions.

The shaft 15 is rotated from the motor 48 by means of said sprocket wheels 41, 43 and chain 42.

Figure 3:
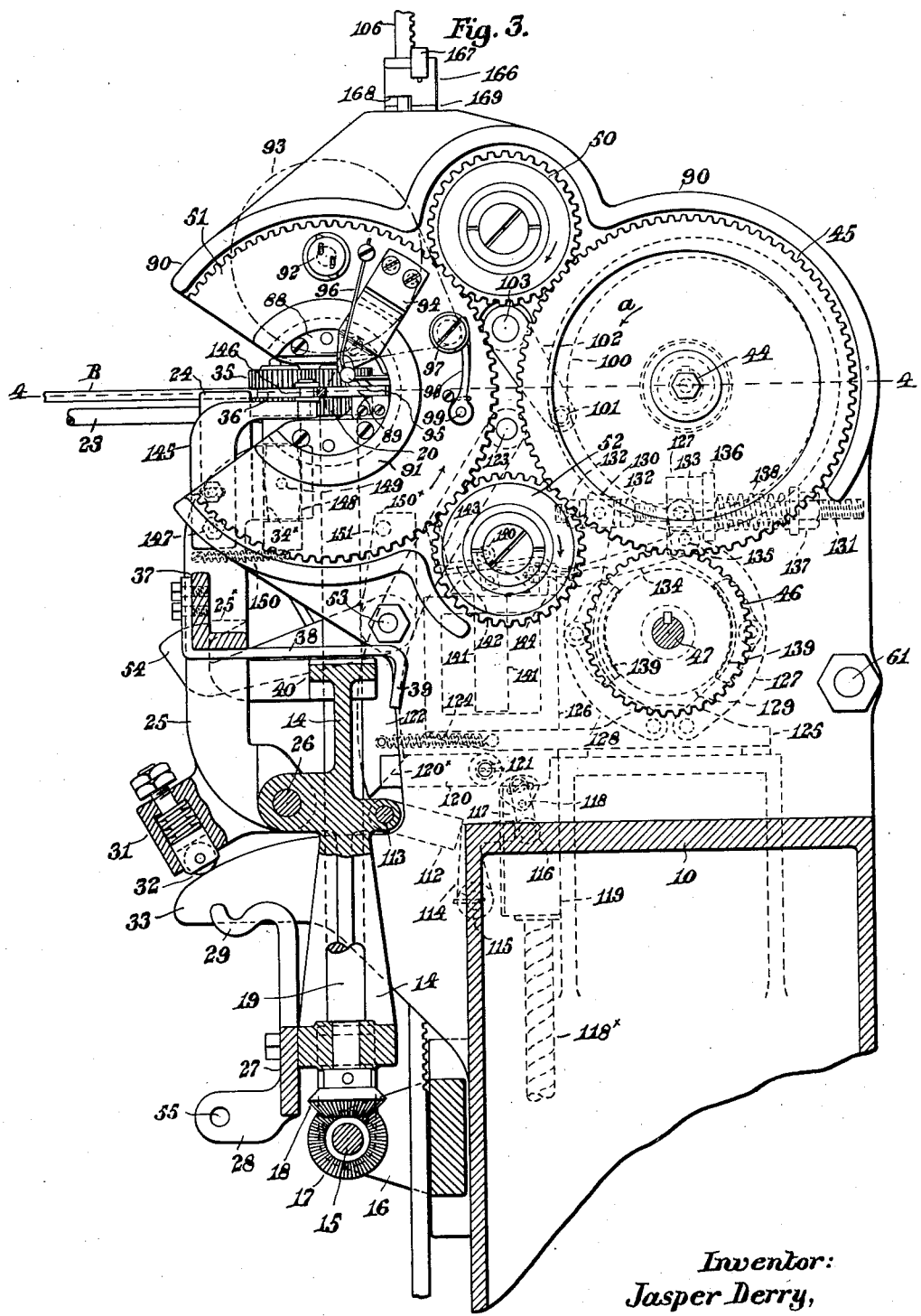
Figure 3 represents a partial section of the upper portion of the machine on line 3, 3, on Fig. 1, and drawn to an enlarged scale.

The gear 45 meshes with an immediate gear 50 which in turn meshes with the teeth of a segmental shuttle 51, as shown in Fig. 3.

The gear 45 rotates in the direction of the arrow $a$ on Fig. 3.

Another intermediate gear 52 meshes with both of the gears 45, 51.

To the frame 10 is pivoted, at 53, a latch 54 which engages a part $25x$ of the arm 25 and retains said arm in the position indicated in the drawings during the wrapping operation.

At the conclusion of the wrapping operation this latch 54 is released from engagement with the part $25x$ of the arm 25 by means to be hereinafter described.

This disengagement of the latch 54 will permit the arm 25 to move forwardly about its pivot 26 and separate the gears 35 from the gears 20, thereby providing means whereby the wrapped bead B may be removed and another bead placed in position to be wrapped, it being understood that at this time the member 14 is in its forward position.

The ear 28 has pivoted thereto, at 55, a plunger 56, the lower end of which is disposed in a dash pot 57 loosely mounted on the pin 12 and having extending upwardly therefrom a breather pipe $57x$.

When the member 14 is moved into its inclined position about the shaft 15, the movement will be gradual and without shock due to movement of plunger 56 in the dash pot 57.

Pivoted to the shaft 26 is an L-shaped bar 58, the rear end of which is pivotally connected at 59 to a lever 60 pivoted to frame 10 at 61 and having at its upper end a pivoted stud 62 through which projects one end of a rod 63, the opposite end of which is connected to the knife mechanism for severing the wrapping tape when each wrapping operation has been completed.

The forward end of rod 63 fits over a pin 64 on a lever 65 pivoted at 66 to the top plate 67 of the knife-guiding support 68.

The lever 65 has pivoted thereto, at 69, a flat plate 70 normally retained by the spring 71 against a stop pin 72 on said lever 65.

Under normal conditions the outer end of the plate 70 abuts a pin 73 on a latch 74 pivoted at 75 to the support 68, the free end of said latch engaging a notch 76 in the reciprocating knife bar 77, the forward end of which is provided with a removable knife blade 78.

Figure 5:
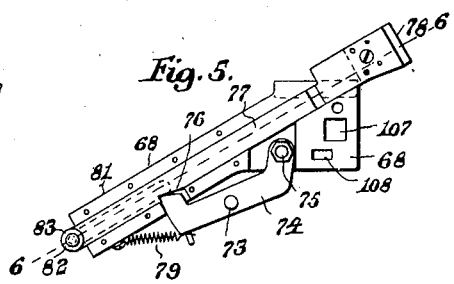
Figure 5 represents a plan of the tape-severing mechanism.
Figure 7:
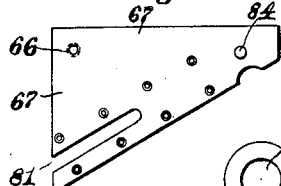
Figure 7 represents a plan of the top plate thereof.
Figure 8:
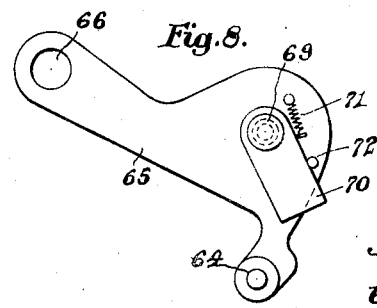
Figure 8 represents a plan of the knife blade latch device.

The latch 74 is retained normally in engagement with the notch 76 of knife bar 77 by means of the spring 79, one end of which is connected to said latch while the opposite end is secured to the support 68, as shown in Fig. 5.

The support 68 and top plate 67 have slots 80, 81 therein in which is disposed the lower end of a pin 82, the upper end of which is surrounded by a roller 83 having a reduced end in the slot 81, said pin 82 extending through the rear end of the knife bar 77.

Extending upwardly from the top plate 67 is a stud 84 between which and the pin 82 is a helical spring 85 adapted to move the knife bar 77 forward when the latch 74 is released from the notch 76.

The knife blade 78 is for cutting off the wrapping material which is a strip of rubberized fabric having sufficient tackiness to cause it to easily adhere to the bead B about which it is being wrapped.

Below said knife blade 78 and immediately to the rear of the edge thereof is a wiper plate 86 which after the fabric or tape has been cut by the knife 78 wipes the severed end of the fabric or tape about the bead causing it to adhere thereto.

The rear end of rod 63 is threaded and extends through an opening in the stud 62 on the upper end of lever 60, the threaded end of the rod 63 having nuts 87 thereon on opposite sides of said stud 62 thereby providing means for adjustment of said rod.

These nuts 87 may be adjusted to accurately time the operation of the tape-severing mechanism.

After the arm 25 commences to move forward about the axis of pin 26 the rod 63 will be forced forward moving the lever 65 about its pivot 66 and causing the plate 70 acting against pin 73 to disengage the latch 74 from the knife bar 77.

The spring 85 will then move the knife bar 77 forward and cause the adhesive tape to be severed by the knife blade 78, after which the severed end will be wiped over the top of the bead B to which it firmly adheres.

This severing of the tape is at a short distance from the center of the tape-winding shuttle-support 88 and the end of the tape remaining in the shuttle 51 will drop down in front of the tape-gripping finger 89 located in the center of said shuttle 51 where it will be forced by said finger against the next bead B inserted in the shuttle.

The gear 45, gear segment or shuttle 51, and intermediate gears 50, 52 are disposed in an open sided casing 90 at the upper end of frame 10.

Two intermediate gears 50, 52 are necessary to insure continuous rotation of the gear segment or shuttle 51 in the center of which is mounted the shuttle-support 88.

The shuttle-support 88 is in the form of an annular segment with its open end toward the front of the machine.

The shuttle-support 88 is secured to the wall of the casing 90 in fixed position with its flange 91 separated from said wall and between said wall and flange and surrounding the periphery of said support is the segmental gear or shuttle 51 freely revoluble on said periphery.

The gripping finger 89 is pivotally secured to said shuttle-support 88 and in the center thereof.

Figure 4:
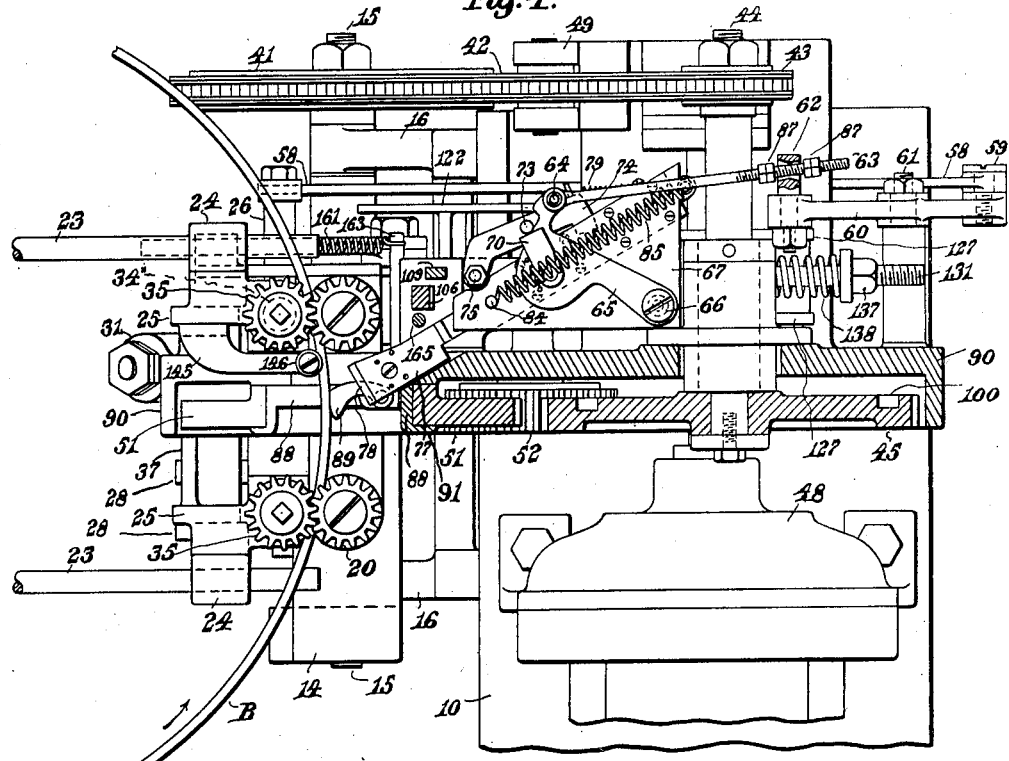
Figure 4 represents a horizontal section on line 4, 4, on Fig. 3.
Figure 6:
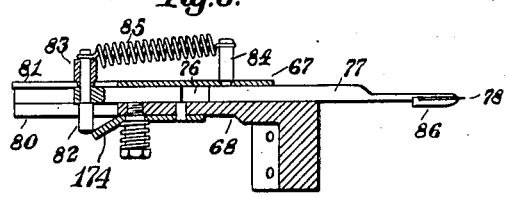
Figure 6 represents a section of same on line 6, 6, on Fig. 5.

This finger 89 is retained in the position indicated in Fig. 4 by a spring 176 and remains in this position until the bead B is fed about its center when the serrations on the finger will be removed from contact with said bead and remain free from contact with the bead B while said bead is being fed.

When the bead B is removed the spring will return it to its normal position as shown in Fig 4.

The direction of movement of the gears 45, 50, 51 and 52 is as indicated by the arrows on Fig. 3 of the drawings.

The segmental gear or shuttle 51 is provided with a stud 92 on which may be mounted a spool 93 of adhesive tape to be used in wrapping the bead B and this stud is provided at its outer end with spring-pressed pins of usual construction to prevent accidental displacement of said spool from said stud.

Also secured to said segmental gear or shuttle 51 is a plate 94 having near the center of the shuttle-support 88 a pin 95 over which and beneath a spring finger 96 the tape passes to a point between the bead B and the gripping finger 89, the outer face of which is curved and serrated.

The segmental gear or shuttle 51 is also provided with a roller 97 around which the tape passes from the spool 93 to the pin 95, said tape being retained in contact with said roller by the spring actuated finger 98 pivoted at 99 to said segmental gear 51.

The path of the tape from spool 93 around the roller 97, and between pin 95 and finger 96 to the gripping finger 89, is indicated by dotted lines in Fig. 3.

The gear 45 on its rear face is provided with a cam path 100 in which is disposed a roller 101 on the end of an arm 102 secured to shaft 103.

The opposite end of the shaft 103 has secured thereto an arm 104 having at its outer end a pivoted pawl 105 normally held in engagement with a measuring rack 106 by means of a spring 105x.

The rack 106 extends through the bearing 107 in the knife support 68 and said support has another bearing 108 for a parallel bar 109 coacting in its upward movement with a pin 109x on pawl 105 to disengage said pawl from the rack 106.

This bar 109 simultaneously with the disengagement of pawl 105 disengages a stop pawl 110 from the rack 106, thereby permitting said rack to drop of its own weight, the pawl 110 being held in normal engagement with rack 106 by the spring 110x.

The lower end of the rack 106 has a lateral pin 111 adapted to coact in its upward movement with a lever 112 pivoted at 113 to the member 14 and lift said lever to disengage it from the trip lever 114, thus allowing said trip lever to be moved about its pivot 115 by the roller 116 on a spring-pressed lever 117 pivoted at 118 and forming a part of a switch mechanism 119 of ordinary construction.

When the lever 117 is thus actuated the switch 119 will be opened cutting off current to the motor 48.

In Fig. 3 the lever 112 is in position to close the switch between two wires in the BX cable 118x of switch mechanism 119.

The rack 106 has also an oppositely extending lateral pin 111x which in the upward movement of the rack 106 and at a predetermined time comes into contact with the arm 120 pivoted at 121 having a limited movement about said pivot.

The pin 111x does not come into contact with arm 120 until rack 106 has been moved the distance of one tooth after pin 111 has moved the lever 112 to cut off the current.

By this means the shuttle 51 will make one complete revolution after the current has been cut off.

The outer end of the arm 120 has a beveled end 120x in contact with the inclined lower end of the curved member 122 pivoted at 123, the ends of said member 122 and arm 120 being retained in contact under normal conditions by the spring 124, one end of which is secured to the member 122 while the other end is secured to a base plate 125 on which is mounted a solenoid 126.

Pivoted to the base 125 are two brake arms 127, 128 adapted to coact with the periphery of the brake disk 129 secured to the motor shaft 47.

The upper end of the brake arm 128 is pivotally connected to a block 130 adjustable on the threaded member 131 by the nuts 132, while the upper end of the arm 127 straddles a block 133 formed on the threaded member 131 and having trunnions projecting therefrom through bearings in a forked member 134 pivotally connected to the arm 127 at 135.

A plate 136 is secured to the upper end of the arm 127 and loosely surrounding the member 131 between this plate 136 and the adjustable nut 137 is a helical spring 138.

Each arm 127, 128 is provided with a friction pad or shoe 139 pivoted thereto and adapted to be forced into contact with brake disk 129 by the spring 138 when released.

The forward end of the member 134 is flattened and projects beneath a roller 140 pivotally connected to the armature 141 of the solenoid 126 and has secured to its forward end a notched plate 142 with the notch of which engages the detent 143 secured to one side of the member 122.

When the detent 143 is removed from the notch in plate 142 the spring 138 will move the member 134 about its pivot 135 and lift the armature 141 and at the same time move the friction pads or shoes 139 into contact with the brake disk 129.

When the switch 119 is again closed the current will energize the solenoid 126, pulling down the armature 141, thus through the member 134 and coacting elements removing the brake shoes 139 from brake disk 129, the member 122 at the same time returning to its normal position with the detent 143 in the notch of the plate 142 on member 134.

The outward movement of arm 128 is limited by the adjustable stop member 144 mounted on the top of solenoid 126.

The arm 25 has secured to its upper end an L-shaped member 145 carrying a roller 146 which bears against the inner side of the bead B, this member having a limited adjustment about the pivot 147 to provide for different diameters and thicknesses of bead.

The gears 35 freely revolve about the members 150

34, 34x, the member 34x having a limited rocking movement relatively to the arm 25 on which the members 34, 34x are mounted in cylindrical openings 148 in rearward extensions on said arm 25.

The member 34x has cone-shaped portions between which is a pivot pin 149 about the axis of which said member may rock.

The lower end of the member 34x is connected by a spring 150 to the arm 25 which spring retains the teeth of the gear 35 on said member 34x in mesh with the teeth of a gear 20.

The bottoms of the grooves in said gears obtain a firm grip upon the bead B interposed between the two sets of gears 20, 35.

Obviously, when these gears 20, 35 are rotated the annular bead B supported on the rollers 22 will be moved about the center of said bead, and this feeding of the bead B will be continuous during the entire wrapping operation.

The member 34x is made movable about the pivot 149 to accommodate it to the wrapped portion of the bead being fed between its gear 35 and one of the gears 20.

The latch 54 has an upward extension 150x having at its upper end a lateral pin 151 adapted to coact with a tripping member 152 pivoted at 153 to a plate 154 pivoted at 155 to the side face of casing 90.

The plate 154 is normally held by a spring 156 against a pin 157 projecting from the casing 90 and has projecting from a side face thereof a stop pin 158 against which the rear end of said tripping member 152 is normally held by the spring 159.

The latch 54 is held in normal engagement with the part 25x of arm 25 by the spring 161 interposed between the pin 162 on casing 90 and the upwardly extending pin 163 on said latch member 54.

The upward movement of the latch 54 is limited by the stop member 164 secured to casing 90.

Resting on the outer end of the member 152 is a vertical rod 165 slidably mounted in bearings projecting from one face of casing 90.

Any downward pressure on this rod 165 will cause the inclined end of member 152 to force the pin 151 forward, thereby moving the latch 54 about its pivot 53 and releasing it from engagement with the part 25x of swinging arm 25 so that the latter may move to its extreme forward position.

When pressure is released from the upper end of rod 165 the spring 156 acting on the plate 154 will return said rod to its upper position as soon as the rack 106 has been slightly raised after the machine is again put in operation.

The lower end of the notched bar 109 normally rests on the roller 140 on the upper end of the armature 141.

The measuring rack 106 has adjustably mounted thereon a block 166 secured thereto in adjusted position by means of a locking plate 167.

The block 166 is provided with an offset portion 168 the under face of which in the downward movement of the rack 106 contacts with the rod 165 and forces it downwardly.

The lower end of the block 166 is provided with a rubber pad 169 which prevents shock and noise when the block 166 reaches its extreme lowest position and comes into contact with the guide member 170.

The pin 109x on the pawl 105 and a similar pin 171 on the pawl 110 are normally in notches 172, 173 in the bar 109 but when this bar 109 is raised the inclined surfaces of the notches 172, 173 will move the pawls 105, 110 about their pivots and disengage them from the teeth of the rack 106 which will then drop of its own weight.

When the bar 109 is being raised by pawl 105 the pawl 110 will be forced from engagement with the teeth of the rack 106 but when the rack 106 has been raised one tooth the spring 110x will immediately engage the pawl 110 with the rack teeth retaining said rack 106 in its adjusted position while the pawl 105 is moving downwardly into position to engage the next lower tooth.

It is obvious that by this construction the rack 106 will be raised tooth by tooth until such time as both pawls 105, 110 are disengaged from the teeth of rack 106 to permit said rack to drop.

The notched bar 109 rests on the roller 140 on the top of the armature 141 and when the solenoid 126 is energized the armature 141 will be drawn down moving the member 134 therewith until the detent 143 engages the notch in plate 142 on the member 134.

When thus engaged the shoes 139 will be free from contact with the brake disk 129 so that the motor 48 may actuate the various mechanisms, thus permitting the rack 106 to be raised tooth by tooth until the pin 111 moves the lever 112 from contact with the member 114, thus cutting off the current in the limit switch 119 so that no further current goes to motor 48.

After the pin 111 has actuated the lever 112, the pin 111x will come into contact with the brake detent tripping lever 120 and move the same upwardly about its pivot 121, thereby forcing lever 122 about its pivot 123 until the detent 143 is disengaged from the notch in plate 142.

When this has been done the spring 138 will act to move the brake arms 127, 128 towards the brake disk 129 until the shoes 139 contact therewith.

At the same time, the rearward movement of the threaded member 131 will move the member 134 about its pivot 135 causing its flattened end to lift the armature 141 and in so doing raise the notched bar 109 until the pawls 105, 110 are both disengaged from the rack 106, thus permitting the rack to drop and cause the rod 165 to move the lever 154 about its pivot sufficiently to effect through the medium of tripping member 152 a disengagement of the latch 54 from the part 25x of the swinging frame 25.

It is self-evident that by the means described the switch 119 will be actuated first, to cut off the current to motor 48, and then the brakes will be applied to stop all movement of the shuttle 51, after which the frame 25 will be released so that by its own weight it will move forwardy to permit the removal of the wrapped bead.

When the frame 25 is moved forwardly about its pivot 26 it will cause the member 14 to be moved forward about the axis of shaft 15.

The amount of tape to be wrapped on a bead may be determined by adjusting the block 166 on the rack 106, it being obvious that the lower said block is on said rack the less upward movement there will be to said rack before the machine is stopped and as a consequence, a lesser amount of tape will be wound than would be the case if the block 166 was secured to said rack near its upper end.

As soon as the lever 154 has reached its lowest position after releasing the latch 54 from part 25x the latch 54 will be returned immediately by spring 161 to its original position ready to engage again the part 25x when the frame 25 is moved once more into position for another wrapping operation.

On the return movement of lever 154 the member 152 will move about its pivot 153 against the tension of spring 159 until it has passed upwardly past the pin 151 into its normal position ready for another operation.

To the under side of the support 68 is secured a spring-pressed buffer plate 174 having an inclined outer end with which the lower end of pin 82 coacts to retard the forward movement of the knife bar 77 when the wrapping tape has been severed.

The current from any suitable source of electric energy leads to the junction box 175 at the rear of the machine from which by means of a suitable circuit it is connected to the solenoid 126 and through the BX cable 118x and switch box 119 leads to the motor 48.

It is deemed unnecessary to show and describe the electric circuit as no novelty resides therein.

The tape-gripping finger 89 is pivoted to the shuttle support 88 at 177 and has a pin 178 extending downwardly therefrom into a curved slot 179 in the support 88, this slot limiting the movement of the finger 89 in either direction.

Between the pin 178 and pin 180 secured to support 88 is the spring 176 normally retaining the finger in the position shown in Fig. 18.

When the bead B is fed about its center the finger 89 will be moved about its pivot 177 until the serrated face 181 is free from contact with said bead, the rounded end 182 of said finger 89 riding over the bead while it is being fed.

As soon as the wrapped bead is removed the spring 176 will return the finger to its normal position ready for another wrapping operation.

The arm 120 has formed in its hub 183 a slot 184 through which extends a pin 185 projecting from the stud 121, thus limiting the movement of the arm 120 about the axis of said stud in either direction.

The members 112 and 114 are limited in their movements in a similar manner.

In the operation of the machine a bead B to be wrapped is placed on the supporting rollers 22 while the bead supports 14, 25 are in a forwardly inclined position, portions of said bead being placed between the two sets of spur gears 20, 35 and in the grooves 21, 36 thereof, the combined depth of the two grooves being less than the thickness of the bead.

When the bead B has been positioned in this manner the operator depresses the treadle 13 and this movement will cause the member 14 to be moved to the rear until the parallel shafts 19 are vertical, as shown in Fig. 3.

At the same time the arm or frame 25 will be carried to the rear and as the roller 32 moves over the cam 33 said arm or frame 25 will be moved about its pivot 26 until the two sets of gears 20, 35 are in mesh with the bead B gripped in the grooves 21, 36 thereof.

The gripped portion of the bead will be at this time in the center of the shuttle 51 so that when the machine is started the bead will be moved by the gears 20, 35 contra-clockwise and the tape 93 of wrapping material will be wrapped about the bead with each turn of the tape abutting the edge of the tape in the preceding turn.

When the member 14 and arm 25 are moved to the rear, the latch 54 will lock the arm to the frame 10 and said arm will remain in this position until a bead has been wrapped.

When the operator once steps on the foot treadle the bead B will be carried into the wrapping machine and without any further effort of the operator the bead will be wrapped, the machine stopped and the bead fully wrapped returned to its original position where it can be quickly and easily removed from the machine.

At the completion of the wrapping operation the tape will be severed with its severed end wrapped upon the bead B, while the end of the tape remaining in the machine will be in front of the grip finger 89 which will hold the tape firmly against a new bead when moved into the center of the shuttle 51.

Adjustment may be made for different sized beads by positioning the square collar 166 on the upper end of the measuring rack.

This adjustment may be made also to provide for the complete wrapping of a bead or for a wrapping only over the splice thereof.

It will be understood that when the frame 14 is moved into the position shown in Fig. 3, the lever 112 carried by said frame 14 will contact with the trip lever 114 and close the switch 119, permitting current to pass to motor 48 and place the machine in operation.

The machine will continue to operate until the measuring rack 106 has travelled the distance for which it has been set when the pins 111, 111x thereon will actuate the tripping devices 112, 120, thereby permitting the members 14, 25 to return to their forward inclined positions and at the same time actuate the brake mechanism to stop the machine.

While the brake shoes 139 are being applied to brake disk 129 the knife bar 77 is being advanced to cause the tape to be severed by blade 78 and this bar 77 continues to advance a short distance before the rocker arm 25 and member 14 move forward, thereby permitting the severed end of the tape to be forced into contact with the bead B by means of the wiper plate 86.

The end of tape remaining in the machine drops down in front of the finger 89 where it will remain until the next bead to be wrapped is forced into contact therewith, thereby causing said end to adhere to the bead preparatory to the operation of wrapping thereof.

When the member 14 is released and moves forward it will move a short distance before the knife blade 78 is released, and as the tape is wound around the bead and the bead is still gripped by the gears 20, 35 enough tape will be pulled out before it is cut by the severing knife to leave a severed end to be wiped over the bead and at the same time leave on the tape within the shuttle a loose end which will drop over the serrated face of finger 89, this loose end having sufficient length to reach to the bottom of the new bead B when inserted into the shuttle.

As a consequence, whenever a new bead is moved into the shuttle, the loose end of the tape within said shuttle will be immediately engaged with said bead and the wrapping operation commenced at once, the finger 89 by the feeding of the bead being moved about its pivot into position where it will not interfere with the wrapping operation.

While the machine has been described as particularly adapted for wrapping beads for tires, it is self-evident that it may be used to advantage in wrapping other annular objects having a relatively small diameter in cross section.

It is believed that the many advantages of the invention will be understood readily without further description.

Having thus described my invention, I claim:

1. In a machine of the class described, the combination of means for supporting a tire bead; means for positively gripping and feeding said bead about its center; a tape-feeding mechanism between said gripping means adapted to wrap said tape around said bead in helical winds; and means for severing the tape at a predetermined time in the wrapping operation.

2. In a machine of the class described, the combination of means for supporting a tire bead; means for feeding said bead about its center; a tape-feeding mechanism adapted to wrap said tape around said bead in helical winds; means for severing the tape at a predetermined time in the wrapping operation; and means for forcing the end of the tape remaining in the tape-feeding mechanism into contact with the bead at the beginning of each wrapping operation.

3. In a machine of the class described, the combination of means for supporting a tire bead; means for positively gripping and feeding said bead about its center; a tape-feeding mechanism between said gripping means adapted to wrap said tape around said bead in abutting helical winds; means for severing the tape at a predetermined time; and means for subsequently wiping the severed end of the tape upon the bead.

4. In a machine of the class described, the combination of means for supporting a tire bead; means for feeding said bead about its center; a rotatable shuttle; a tape-feeding mechanism thereon adapted to wrap said tape around said bead in abutting helical winds; means for severing the tape at a predetermined time; automatic means for subsequently removing the bead-feeding means from said shuttle; and automatic means for releasing the bead from its feeding mechanism.

5. In a machine of the class described, the combination of means for supporting a tire bead; means for feeding said bead about its center; a rotatable shuttle; a tape-feeding mechanism thereon adapted to wrap said tape around said bead in helical winds; a driving mechanism; automatic means for stopping said driving mechanism; and means for subsequently severing the tape at the completion of the wrapping operation and forcing the severed end of said tape into contact with said bead.

6. In a machine of the class described, the combination of a rotatable semi-annular shuttle provided with means for supporting thereon a spool of adhesive tape; means adapted to support a tire bead with a portion thereof centrally disposed in said shuttle and rotate it about its center consisting of intermeshing gears on opposite sides of said bead and provided with bead receiving and gripping grooves; and means carried by said shuttle for wrapping said tape around said bead during the rotation of said bead.

7. In a machine of the class described, the combination of a rotatable semi-annular shuttle; tape-feeding mechanism carried by said shuttle; rotatable means on opposite sides of said shuttle and closely adjacent thereto for gripping a tire bead and feeding it about its center during the rotation of said shuttle while the gripped portion of said bead is disposed within said shuttle; and means for stopping the rotation of said shuttle always at a predetermined point to permit the removal of the wrapped tire bead.

8. In a machine of the class described, the combination of a rotatable semi-annular shuttle; tape-feeding mechanism carried by said shuttle; rotatable means on opposite sides of said shuttle and closely adjacent thereto for gripping a tire bead and feeding it about its center during the rotation of said shuttle while the gripped portion of said bead is disposed within said shuttle; gear teeth on the periphery of said shuttle; and gearing meshing with said teeth for imparting continuous rotation to said shuttle.

9. In a machine of the class described, the combination of a rotatable semi-annular shuttle; tape-feeding mechanism carried by said shuttle; rotatable means on opposite sides of said shuttle and closely adjacent thereto for gripping a tire bead and feeding it about its center during the rotation of said shuttle while the gripped portion of said bead is disposed within said shuttle; gear teeth on the periphery of said shuttle; gearing meshing with said teeth for imparting continuous rotation to said shuttle; a motor for actuating said gearing; a brake mechanism co-acting with said motor; and means for actuating said brake mechanism at a predetermined time.

10. In a machine of the class described, the combination of a rotatable semi-annular shuttle provided with means for supporting a spool of adhesive tape; a rotatable grooved gear adapted to be disposed opposite a side of said shuttle and near the center thereof; a swinging tire bead support provided with another grooved gear; mechanism for moving said support to bring said gears into mesh; and means carried by said shuttle for wrapping said tape around said bead as it is fed by said gears.

11. In a machine of the class described, the combination of a rotatable semi-annular shuttle provided with means for supporting a spool of adhesive tape; a rotatable grooved gear adapted to be disposed opposite a side of said shuttle and near the center thereof; a swinging tire bead support provided with another grooved gear; mechanism for moving said support to bring said gears into mesh; means carried by said shuttle for wrapping said tape around said bead as it is fed by said gears; and a tape severing knife operable at a predetermined time.

12. In a machine of the class described, the combination of a rotatable semi-annular shuttle provided with means for supporting a spool of adhesive tape; a rotatable grooved gear adapted to be disposed opposite a side of said shuttle and near the center thereof; a swinging tire bead support provided with another grooved gear; mechanism for moving said support to bring said gears into mesh; means carried by said shuttle for wrapping said tape around said bead as it is fed by said gears; a tape-severing knife operable at a predetermined time; and means for retaining the severed end of the tape in position to be used at the commencement of the next bead wrapping operation.

13. In a machine of the class described, the combination of a rotatable semi-annular shuttle; tape-feeding mechanism carried by said shuttle; rotatable means on opposite sides of said shuttle and closely adjacent thereto for gripping a tire bead and feeding it about its center during the rotation of said shuttle while the gripped portion is disposed within said shuttle; and means operable at the completion of the wrapping operation for releasing said bead after removal from said shuttle.

14. In a machine of the class described, the combination of a rotatable semi-annular shuttle; tape-feeding mechanism carried by said shuttle; rotatable means for gripping a tire bead and feeding it about its center during the rotation of said shuttle while the gripped portion is disposed within said shuttle; and means operable at the completion of the wrapping operation for automatically removing said bead feeding mechanism from said shuttle.

15. In a machine of the class described, the combination of a rotatable semi-annular shuttle having peripheral teeth and provided with means for supporting thereon a spool of adhesive tape; a rotatable driving gear; two oppositely disposed intermediate gears both meshing with the teeth of said shuttle and gear; means adapted to support a tire bead with a portion of said bead centrally disposed in said shuttle and rotating it about its center; and means carried by said shuttle for wrapping said tape around said bead during the rotation of said bead.

16. In a machine of the class described, the combination of a rotatable semi-annular shuttle provided with means for supporting thereon a spool of adhesive tape; bead feeding and supporting means adapted to be moved into position to centrally dispose in said shuttle a portion of a tire bead and rotate it about its center; means carried by said shuttle for wrapping said tape around said bead during the rotation of said bead; and gearing for continuously rotating said shuttle.

17. In a machine of the class described, the combination of a rotatable semi-annular shuttle provided with means for supporting a spool of adhesive tape; a rocker frame; a rotatable grooved feed gear carried thereby adapted to be disposed opposite a side of said shuttle and near the center thereof; a swinging tire bead supporting arm pivoted to said rocker frame and provided with another grooved feed gear; mechanism for moving said bead support and rocker frame to bring said gears into mesh to grip a portion of said bead disposed within said shuttle; and means carried by said shuttle for wrapping said tape around said bead as it is fed by said gears.

18. In a machine of the class described, the combination of a rotatable semi-annular shuttle provided with means for supporting a spool of adhesive tape; a rocker frame; a rotatable grooved feed gear carried thereby and adapted to be disposed opposite a side of said shuttle and near the center thereof; a swinging tire bead supporting arm pivoted to said rocker frame and provided with another grooved feed gear; mechanism for moving said bead-supporting arm and rocker frame to bring said gears into mesh to grip a portion of said bead disposed within said shuttle; means carried by said shuttle for wrapping said tape around said bead as it is fed by said gears; and a tape-severing knife operable at the completion of the wrapping operation.

19. In a machine of the class described, the combination of a rotatable semi-annular shuttle provided with means for supporting a spool of adhesive tape; a rocker frame; a rotatable grooved feed gear carried thereby and adapted to be disposed opposite a side of said shuttle and near the center thereof; a swinging tire bead supporting arm pivoted to said rocker frame and provided with another grooved feed gear; mechanism for moving said bead supporting arm and rocker frame to bring said gears into mesh to grip a portion of said bead disposed within said shuttle; means carried by said shuttle for wrapping said tape around said bead as it is fed by said gears; a latch adapted to retain said arm in operative position; and means for releasing said latch from said arm at the completion of each wrapping operation.

20. In a machine of the class described, the combination of a rotatable semi-annular shuttle provided with means for supporting a spool of adhesive tape; a rocker frame; a rotatable grooved feed gear carried thereby adapted to be disposed opposite a side of said shuttle and near the center thereof; a swinging tire bead supporting arm pivoted to said rocker frame and provided with another grooved feed gear and having a spring-pressed roller thereon; a fixed cam member with which said roller coacts to bring said gears into mesh; means for moving said rocker frame to bring said feed gears in position to dispose a portion of the bead within said shuttle; and means carried by said shuttle for wrapping said tape around said bead as it is fed by said gears.

21. In a machine of the class described, the combination of a rotatable semi-annular shuttle provided with means for supporting a spool of adhesive tape; a rocker frame; a rotatable grooved feed gear carried thereby and adapted to be disposed opposite a side of said shuttle and near the center thereof; a swinging tire bead-supporting arm pivoted to said rocker frame and provided with another grooved feed gear; mechanism for moving said rocker frame to dispose a portion of the bead within the shuttle; means operable during the movement of said rocker frame adapted to bring said gears into mesh; and means carried by said shuttle for wrapping said tape around said bead as it is fed by said gears.

22. In a machine of the class described, the combination of a rotatable semi-annular shuttle provided with means for supporting a spool of adhesive tape; a rocker frame; a rotatable grooved feed gear carried thereby and adapted to be disposed opposite a side of said shuttle and near the center thereof; a swinging tire bead supporting arm pivoted to said rocker frame and provided with another grooved feed gear; mechanism for moving said rocker frame toward the shuttle and simultaneously bring said gears into mesh with a portion of the bead within said shuttle; and means carried by said shuttle for wrapping said tape around said bead as it is fed by said gears.

23. In a machine of the class described, the combination of a rotatable semi-annular shuttle; tape-feeding mechanism carried thereby; means for supporting a tire bead in position to be wrapped by said tape; means for gripping the opposite annular faces of said bead and feeding it about its center during the rotation of said shuttle; and means for removing the bead-gripping means from the shuttle and subsequently releasing the bead.

24. In a machine of the class described, the combination of a rotatable semi-annular shuttle provided with means for supporting thereon a spool of adhesive tape; means adapted to be centrally disposed in said shuttle for supporting a tire bead and rotating it about its center; means carried by said shuttle for wrapping said tape around said bead during the rotation of said bead; mechanism for locking the bead-supporting means in position for the bead to be wrapped; and means for releasing the locking mechanism at the completion of the wrapping operation.

25. In a machine of the class described, the combination of a rotatable semi-annular shuttle provided with means for supporting thereon a spool of adhesive tape; means adapted to support a portion of a tire bead centrally in said shuttle and rotate it about its center; means carried by shuttle for wrapping said tape around said bead during the rotation of said bead; mechanism for locking the bead supporting means in position for the bead to be wrapped; and means for releasing the locking mechanism at the completion of the wrapping operation and subsequently releasing the bead from its rotating means.

26. In a machine of the class described, the combination of a rotatable semi-annular shuttle having peripheral teeth and provided with means for supporting thereon a spool of adhesive tape; a semi-annular flanged support for said shuttle fixed to the frame; a rotatable driving gear; two oppositely disposed intermediate gears both meshing with the teeth of said shuttle and gear; means adapted to be centrally disposed in said shuttle for supporting a tire bead and rotating it about its center; and means carried by said shuttle for wrapping said tape around said bead during the rotation of said bead.

27. In a machine of the class described, the combination of a rotatable semi-annular shuttle provided with means for supporting thereon a spool of adhesive tape; bead feeding and supporting means adapted to be moved into position to dispose centrally in said shuttle a portion of a tire bead and rotate said bead about its center; means carried by said shuttle for wrapping said tape around said bead during the rotation of said bead; and means for simultaneously rotating both said shuttle and bead.

28. In a machine of the class described, the combination of a rotatable semi-annular shuttle provided with means for supporting thereon a spool of adhesive tape; bead feeding and supporting means adapted to be moved into position to dispose centrally in said shuttle a portion of a tire bead and rotate said bead about its center; means carried by said shuttle for wrapping said tape around said bead during the rotation of said bead; an electric motor for simultaneously rotating both said shuttle and bead; and automatic means operable at a predetermined time in the operation of the machine for cutting off the electric current for said motor.

29. In a machine of the class described, the combination of a rotatable semi-annular shuttle provided with means for supporting thereon a spool of adhesive tape; means adapted to support a portion of a tire bead centrally in said shuttle and rotate it about its center consisting of intermeshing gears on opposite sides of said bead and provided with bead-receiving and gripping grooves; means carried by said shuttle for wrapping said tape around said bead during the rotation of said bead; and means for separating said gears to permit the positioning of a bead.

30. In a machine of the class described, the combination of a rotatable semi-annular shuttle provided with means for supporting thereon a spool of adhesive tape; means adapated to support a portion of a tire bead centrally in said shuttle and rotate it about its center consisting of intermeshing gears on opposite sides of said bead and provided with bead-receiving and gripping grooves; means carried by said shuttle for wrapping said tape around said bead during the rotation of said bead; means for automatically removing the bead-rotating means from the shuttle; and means for subsequently separating said gears to permit the positioning of a bead.

31. In a machine of the class described, the combination of means for supporting a tire bead; means for feeding said bead about its center; a tape-feeding mechanism adapted to wrap said tape around said bead in helical winds; a driving mechanism; means for stopping said driving mechanism; a tripping device for releasing said stopping means; and a vertically movable member provided with means for actuating said tripping means at a predetermined point in its movement.

32. In a machine of the class described, the combination of means for supporting a tire bead; means for feeding said bead about its center; a tape-feeding mechanism adapted to wrap said tape around said bead in helical winds; a motor; a brake disk on the shaft thereof; brake shoes adapted to coact with said disk but normally removed from contact therewith; a tripping device for releasing said brake shoes; means for forcing said shoes into contact with said disk when released; and a vertically movable member provided with means for actuating said tripping means at a predetermined point in its movement.

33. In a machine of the class described, the combination of means for supporting a tire bead; means for feeding said bead about its center; a tape-feeding mechanism adapted to wrap said tape around said bead in helical winds; a driving mechanism; stopping means therefor; a rack adapted to be raised tooth by tooth; and means coacting therewith for actuating said stopping mechanism.

34. In a machine of the class described, the combination of means for supporting a tire bead; means for feeding said bead about its center; a tape-feeding mechanism adapted to wrap said tape around said bead in helical winds; a driving mechanism; a brake mechanism for stopping said driving mechanism; a rack adapted to be raised tooth by tooth; and means coacting therewith for actuating said brake at a predetermined point in the movement of said rack.

35. In a machine of the class described, the combination of means for supporting a tire bead; means for feeding said bead about its center; a tape-feeding mechanism adapted to wrap said tape around said bead in helical winds; a driving mechanism; stopping mechanism therefor; a vertically movable rack; means coacting therewith for actuating said stopping mechanism; a cam-actuated pivoted lever; a pawl pivoted to the free end of said lever and engaging the teeth of said rack; means for releasing the pawl from engagement with said rack and permitting said rack to drop; a block on said rack; a vertically movable rod in the path of said block adapted to be moved downwardly when the rack is dropped; a latch for retaining the bead-supporting means in operative position; and means actuated by the downward movement of said rod for releasing said latch.

36. In a machine of the class described, the combination of means for supporting a tire bead; means for feeding said bead about its center; a tape-feeding mechanism adapted to wrap said tape around said bead in helical winds; a vertically movable rack; a cam-actuated pivoted lever; a pawl pivoted to the free end of said lever and engaging the teeth of said rack; means for releasing the pawl from engagement with said rack and permitting said rack to drop; a block adjustably mounted on said rack; a vertically movable rod in the path of said block adapted to be moved downwardly when the rack is dropped; a latch for retaining the bead-supporting means in operative position; and means actuated by the downward movement of said rod for releasing said latch.

37. In a machine of the class described, the combination of means for supporting a tire bead; means for feeding said bead about its center; a tape-feeding mechanism adapted to wrap said tape around said bead in helical winds; a vertically movable rack; a cam-actuated pivoted lever; a pawl pivoted to the free end of said lever and engaging the teeth of said rack; means for releasing the pawl from engagement with said rack and permitting said rack to drop; a block on said rack; a vertically movable rod in the path of said block adapted to be moved downwardly when the rack is dropped; a latch for retaining the bead-supporting means in operative position; means actuated by the downward movement of said rod for releasing said latch; and means for subsequently returning said rod and latch to their normal positions.

38. In a machine of the class described, the combination of means for supporting a tire bead; means for feeding said bead about its center; a tape-feeding mechanism adapted to wrap said tape around said bead in helical winds; a driving mechanism; stopping mechanism therefor; a vertically movable rack; means thereon for actuating said stopping mechanism; a cam-actuated pivoted lever; a pawl pivoted to the free end of said lever and engaging the teeth of said rack; a stop pawl; a vertically movable notched bar for releasing both pawls from engagement with said rack and permitting said rack to drop; a block on said rack; a vertically movable rod in the path of said block adapted to be moved downwardly when the rack is dropped; a latch for retaining the bead-supporting means in operative position; means actuated by the downward movement of said rod for releasing said latch; and automatic means for subsequently returning said rod and latch to their normal positions.

39. In a machine of the class described, the combination of a rotatable semi-annular shuttle; tape-feeding mechanism carried by said shuttle; rotatable means for gripping a tire bead and feeding it about its center during the rotation of said shuttle while the gripped portion of said bead is disposed within said shuttle; gear teeth on the periphery of said shuttle; gearing meshing with said teeth for imparting continuous rotation to said shuttle; a movable tape measuring member; a motor for actuating said gearing; a brake mechanism coacting with said motor; and means operated by the movement of said measuring member for actuating said brake mechanism at a predetermined time.

40. In a machine of the class described, the combination of a rotatable semi-annular shuttle; tape-feeding mechanism carried by said shuttle; rotatable means for gripping a tire bead and feeding it about its center during the rotation of said shuttle while the gripped portion of said bead is disposed within said shuttle; gear teeth on the periphery of said shuttle; gearing meshing with said teeth for imparting continuous rotation to said shuttle; a movable tape-measuring member; a motor for actuating said gearing; a brake mechanism coacting with said motor; means operated by the movement of said measuring member for actuating said brake mechanism at a predetermined time; and a solenoid for returning said brake mechanism to its normal position.

41. In a machine of the class described, the combination of a rotatable semi-annular shuttle; tape-feeding mechanism carried by said shuttle; rotatable means for gripping a tire bead and feeding it about its center during the rotation of said shuttle while the gripped portion of said bead is disposed within said shuttle; means for imparting continuous rotation to said shuttle; a movable member for regulating the amount of tape to be wound; a motor for actuating said mechanisms; a brake mechanism coacting with said motor; and means operated by the movement of said movable member for actuating said brake mechanism at a predetermined time.

42. In a machine of the class described, the combination of a rotatable semi-annular shuttle; tape-feeding mechanism carried by said shuttle; rotatable means for gripping a tire bead and feeding it about its center during the rotation of said shuttle while the gripped portion of said bead is disposed within said shuttle; means for imparting continuous rotation to said shuttle; a movable tape-measuring member; a motor for actuating said mechanisms; a brake mechanism coacting with said motor; means operated by the movement of said measuring member for actuating said brake mechanism at a predetermined time; and a solenoid for subsequently returning said brake mechanism to its normal position.

43. In a machine of the class described, a rotatable semi-annular shuttle; tape-feeding mechanism carried by said shuttle; means for feeding an annular object through the eye of said shuttle during the rotation of said shuttle to effect a wrapping of said object; means for removing the object-feeding means from said shuttle; and means for severing the wrapping tape at a predetermined point in the outward travel of said removing means.

44. In a machine of the class described, the combination of means for supporting an annular tire bead; two sets of rotatable means for positively gripping the opposite faces of said bead and feeding it about its center; a tape-feeding mechanism adapted to wrap said tape around said bead in helical winds on a part of said bead between said two sets of gripping means; a driving mechanism; means for stopping said driving mechanism; and means for subsequently severing the tape at the completion of the wrapping operation.

JASPER DERRY.